United States Patent
Kim et al.

(10) Patent No.: US 9,479,077 B1
(45) Date of Patent: Oct. 25, 2016

(54) THREE-PHASE POWER SUPPLY SYSTEM

(71) Applicant: Google Inc., Mountain View, CA (US)

(72) Inventors: Sangsun Kim, San Jose, CA (US); Francisco J. Elias, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 14/145,713

(22) Filed: Dec. 31, 2013

Related U.S. Application Data

(60) Provisional application No. 61/760,500, filed on Feb. 4, 2013.

(51) Int. Cl.
*H02M 7/217* (2006.01)
*H02M 1/00* (2006.01)

(52) U.S. Cl.
CPC .................. *H02M 7/2173* (2013.01)

(58) Field of Classification Search
CPC ........................................................ H02M 1/00
USPC ................................................................ 307/2
See application file for complete search history.

(56) References Cited

U.S. PATENT DOCUMENTS

| | | | |
|---|---|---|---|
| 1,952,031 A | 3/1934 | Miller | |
| 4,433,276 A | 2/1984 | Nola | |
| 5,003,453 A | 3/1991 | Tighe et al. | |
| 5,321,600 A | 6/1994 | Fierheller | |
| 5,502,630 A | 3/1996 | Rokhvarg | |
| 5,694,312 A | 12/1997 | Brand et al. | |
| 6,385,057 B1 | 5/2002 | Barron | |
| 6,801,005 B2 | 10/2004 | Charleston | |
| 7,821,801 B2 | 10/2010 | Janson et al. | |
| 7,859,874 B2 | 12/2010 | Bovitz | |
| 8,159,802 B2 | 4/2012 | Tinsley, III et al. | |
| 8,223,518 B2 | 7/2012 | Luu | |
| 8,373,394 B1 | 2/2013 | Huta et al. | |
| 8,493,754 B1 | 7/2013 | Wambsganss et al. | |
| 8,614,902 B2 | 12/2013 | Pansier et al. | |
| 2007/0253135 A1 | 11/2007 | Bovitz | |
| 2012/0120697 A1* | 5/2012 | Cuk ................... | H02M 1/4216 363/126 |
| 2012/0262958 A1 | 10/2012 | Feldtkeller et al. | |

FOREIGN PATENT DOCUMENTS

| | | |
|---|---|---|
| EP | 0 562 662 | 5/1997 |
| EP | 0 595 091 | 5/1998 |
| EP | 2 463 978 | 6/2012 |
| EP | 2 173 023 | 1/2013 |
| WO | 2010/007091 | 1/2010 |
| WO | 2010/114513 | 10/2010 |

* cited by examiner

*Primary Examiner* — Robert Deberadinis
(74) *Attorney, Agent, or Firm* — Fish & Richardson P.C.

(57) ABSTRACT

An electric three-phase power supply system includes a primary stage arranged to receive an input of three-phase alternating current power; a transformer stage arranged to receive power from the primary stage and to reduce the three-phase AC power in voltage level, the transformer stage include an independent secondary winding for each of the phases in the alternating current power; a power factor correction (PFC) stage having a plurality of PFC units that each receive AC power for one of the phases in the alternating current power from the transformer stage; and a pair of output terminals that receive power form the PFC units, wherein output terminals of each of the PFC units are tied to each other, and ground terminals of each of the PFC units are tied to a common ground.

20 Claims, 3 Drawing Sheets

THREE-PHASE POWER SUPPLY SYSTEM

CROSS-REFERENCE TO RELATED APPLICATIONS

This application claims priority to U.S. Application Ser. No. 61/760,500, filed on Feb. 4, 2013, the entire contents of which are hereby incorporated by reference.

TECHNICAL FIELD

This document relates to electric power supplies, such as power supplies for use in supplying power to computer server systems that receive multi-phase power as an input.

BACKGROUND

Electric power, particularly for relatively high-power applications, is frequently distributed (e.g., through an electric grid) in three overlapping alternating current (AC) phases that are 120 degrees out of phase with each other. Such power may be generated at a power plant, distributed through an electric utility's grid, and received and stepped down in voltage at transformers in electric substations. Generally, the power is carried by four conductors, or wires—one wire for each of the three phases, and a neutral or ground that is common to all three. The power may be further reduced in voltage (e.g., from medium voltage in the thousands of volts to low voltage in the hundreds of volts) and may be used as 3-phase power by various different loads or separated into multiple single-phase feeds and provided to loads (e.g., to computer server systems and other equipment in a computer data center).

For higher power AC distribution, the 3-phase power needs to be balanced for better efficiency and higher power utilization. Such balancing may be a challenge in power supplies that use power factor correction (PFC) connected to one or more 3-phase distribution transformers, and that have a neutral line that is earth-grounded so as to interfere with the ability to combine the outputs of the different PFC units together.

SUMMARY

The present disclosure discusses systems and methods for processing electric power with an electric power supply system, such as to convert 3-phase AC power to a single DC output via a power factor correction stage. Such systems and methods may also step down the voltage of power. They may additionally separate the phases of 3-phase power and then combine the power after converting it from AC form to DC form for provision to computer servers and other equipment in a computer data center. In certain examples discussed here, a three-phase distribution transformer is connected to three separate PFC circuits, and the outputs of those PFC circuits are tied to a common ground. The outputs of the circuits can also be tied together to each other and provided to a load (e.g., through a pair of terminals connected to the outputs of each PFC circuit), such as a group of computer servers, which may each in turn have their own power supplies, e.g., to further step the power down to even lower voltages (such as single-digit volts).

The system can be housed in a single physical housing or location, or split across multiple housings or locations. For example a transformer stage may be in a particular housing or unit, and may be relatively remote from associated power factor correction units, which may each be in separate housings or in a common housing (e.g., where one housing holds three power factor correction units that serve respective phases of a 3-phase signal).

In certain implementations, the examples discussed here may provide one or more advantages. For example, a high-power power supply system may be provided that can obtain 400 VAC or lower from a three-phase AC power input so that popular and less expensive 600V semiconductor devices can be used in a system. Also, the outputs of the power factor correction units can be tied together, providing for greater levels of power that can be output by such a power supply. In addition, 3-phase line currents are generally well balanced (i.e., a-, b-, and c-phase currents are generally the same in magnitude) thanks to a single PFC output for three-phase converters. Combined output can also simplify the control of such a system (e.g., only a single controller may be required in particular implementations, instead of three individual ones.). In addition, the output capacitor may also be subjected to less stress, because the system may eliminate any second-harmonic ripple on the capacitor that may occur in a typical single phase power supply, so that the capacitor will last longer and be more reliable.

In one implementation, an electric 3-phase power supply system is disclosed. The system comprises a primary stage arranged to receive an input of three-phase alternating current power; a transformer stage arranged to receive power from the primary stage and to reduce the three-phase AC power in voltage level, the transformer stage including an independent secondary winding for each of the phases in the alternating current power; a power factor correction (PFC) stage having a plurality of PFC units that each receive AC power for one of the phases in the alternating current power from the transformer stage; and a pair of output terminals that receive power form the PFC units, wherein output terminals of each of the PFC units are tied to each other, and ground terminals of each of the PFC units are tied to a common ground, which may be an earth ground.

In another implementation, an electric 3-phase power supply system is disclosed that comprises a transformer stage arranged to receive three-phase alternating current (AC) power and to reduce the three-phase AC power in voltage level; a power factor correction (PFC) stage having a plurality of PFC units that each receive AC power from the transformer stage; a pair of output terminals that receive power form the PFC units; and a ground line that connects outputs of each of the plurality of PFC units to a common ground, and wherein the inputs of the respective PFC units are not connected to each other. The transformer stage can have one or more separate transformers to process electrical power from one particular phase of the three-phase AC power. Also, each of the PFC units can comprise a single-phase PFC unit, and can have a winding in the transformer stage that is separate windings for the other of the plurality of PFC units. Moreover, the outputs from each of the PFC units can be connected to each other.

In some aspects, each of the PFC units comprises a diode set arranged to rectify the AC power, and the diode set can comprise two pairs of diodes, wherein each pair of diodes is arranged on opposed sides of a particular power input to the corresponding PFC unit. In addition, each of the PFC units can comprise a PFC controller, wherein each of the PFC controller is arranged to synchronize switch of a corresponding PFC unit with switching of the other PFC units. In certain aspects, the output terminals are connected to supply power to one or more computer server systems in a computer data center. Also, the three-phase AC power can be received by the transformer section between one and 50 kilovolts, and be supplied to the PFC section between 0 and 500 volts.

In yet another implementation, a method for supplying electric power to one or more loads is disclosed. The method comprises receiving three-phase alternating current power at terminals of a power supply system; transforming the power to a lower voltage through a transformer section of the power supply system; correcting power factor of the transformed power in a power factor correction unit that includes a separate power factor module for each phase of the transformed power; passing the power through outputs of the power factor correction modules, each of the power factor correction modules having an output that is tied to a ground that is common to the power factor correction modules; and combining the power from the power factor correction modules into a single pair of terminals for supplying the power from the power factor correction modules.

In certain aspects, transforming the power comprises passing each phase of the three-phase alternating current power through a separate transformer (where such transformer could be three single-phase transformers or a single 3-phase transfer). The method can also comprise controlling the power factor correction modules using MOSFET switches, and the MOSFET switches can be controlled in a coordinated manner by a common power factor correction controller. Also, the method can include providing power from the pair of terminals to one or more computer systems in a computer data center, and the power can be provided to the computer systems below 500 volts.

Other features and advantages will be apparent from the description and drawings, and from the claims.

DETAILED DESCRIPTION

This description discusses systems and techniques for distributing and transforming electric power in a computer data center or other similar facility. In general, a power supply as described here receives three-phase AC power and outputs lower voltage DC power. The voltage is reduced by a transformer stage in the power supply system, and the power is converted from AC to DC in a power factor correction stage. The positive outputs from each of multiple power factor correction modules (each handling a separate one of the phases) are tied together, and the negative outputs from each of the modules are tied together to each other and to a common ground.

Figure 1A:
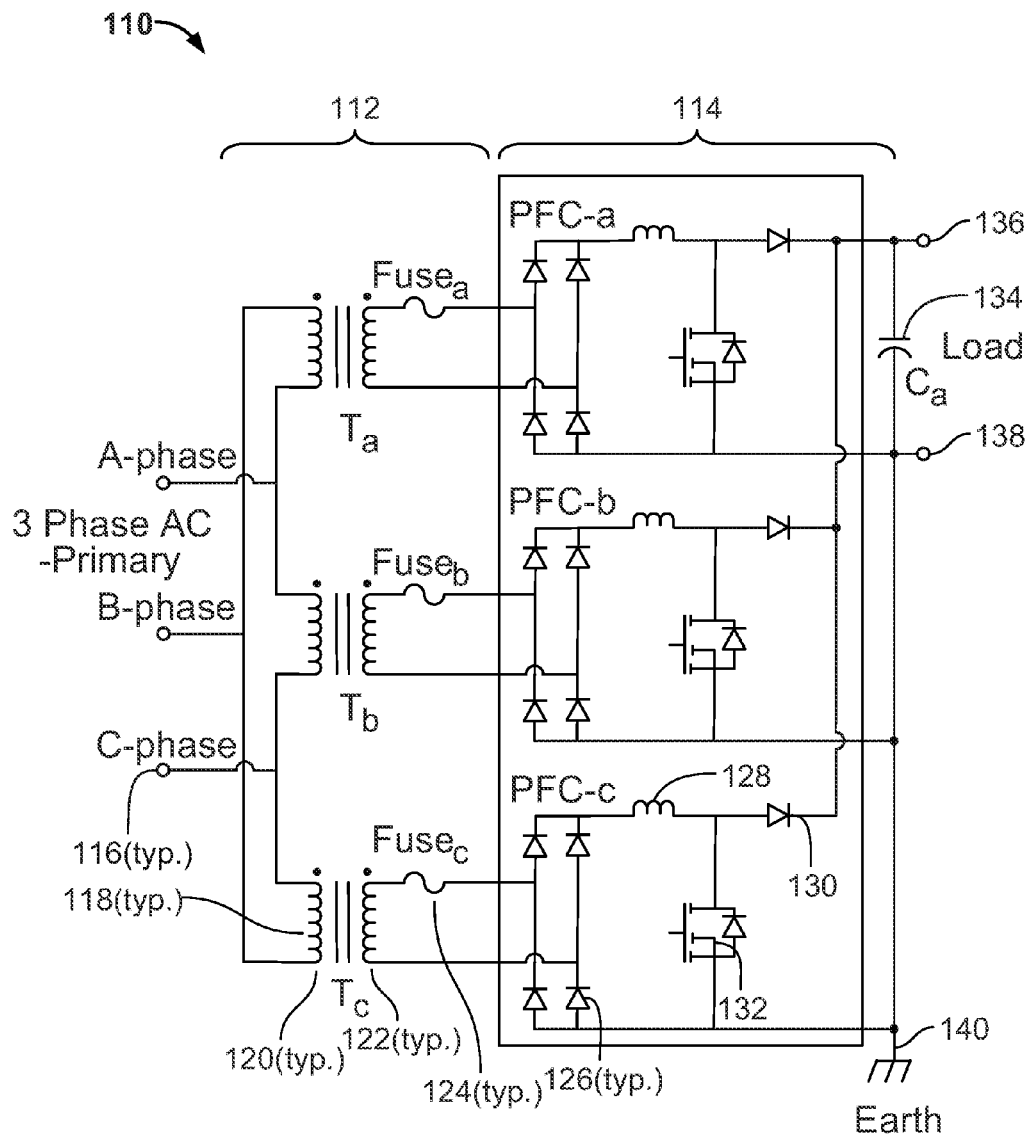
FIG. 1A is schematic diagram of a three-phase power supply.

Referring now to FIG. 1A, there is shown a three-phase power supply system 110. The power supply system 110 is shown in isolation here for clarity, but would, when implemented, be incorporated in a greater power distribution system in a facility such as a computer data center. In particular, the power supply system 110 would be connected in a conventional manner to receive three-phase AC power from another supply of power, and to provide lower voltage (e.g., about 400V or lower) to various types of loads. Also, an overall system would include multiple systems like power supply system 110, where each of the sub-systems may serve a particular computer (or other electrical load) or group of computers, such as a vertical rack of computers, a portion of a rack, or multiple racks. In such an implementation, each of the many multiple power supply systems 110 may be essentially the same as each other system (e.g., have the same input and output parameters, and similar functional parameters). For example, several hundred or thousand matching power supply systems may be implemented in a data center and may receive AC power from a common supply of power, and may each supply power (generally at a lower voltage and DC) to one or more associated computers that correspond to the particular power supply system 110.

In such an implementation, the power supply system 110 may take a variety of implemented forms. For example, the power supply system 110 may be a stand-alone item having its own housing that can be electrically connected (either via standard plugs or via hard-wiring) to a supply of power (e.g., AC power of an appropriate voltage) and one or more loads (either directly or via a further power distribution device like a power strip or a whip having multiple electrical outlets). Alternatively, the power supply system 110 may be incorporated into the housing of the one or more loads that it serves.

As yet another implementation, a plurality of power supplies systems 110 may be included inside a single unit, or housing, and each may provide power to various loads inside or outside the unit. In each such implementation, multiple different power supplies may be controlled by a single common controller, and may each communicate with the controller and/or with each other directly, such as to report their condition and operating status, to request or receive greater or lesser power allocations (where power usage is controlled so as to maximize utilization in an electric distribution system), to receive commands from the controller (which may in turn report to and receive commands from a controller that communicates with many other similar controllers), and the like.

The power supply system 110 in particular includes both a transformer section 112 and a power factor correction stage 114. Generally, the transformer section 112 operates to lower the AC voltage of each of the separate phases of a three-phase power input. For example, the input voltage may be several kilovolts (e.g., 1 KV to 50 KV, or 2 KV to 10 KV, or 5 KV to 50 KV) and the output voltage may be about 400 VAC or other appropriate low voltage value (e.g., 480V, 220-240V, or 110-120V line-to-line).

The power factor correction stage 114 generally operates to convert the power from AC to DC, to obtain near unity power factor, and to regulate the output DC voltage. Such a power factor correction stage 114 may, for example, replace a secondary converter that would exist in a more conventional power supply.

The transformer section 112 includes a trio of conductors 116 that receive power from a standard three-phase AC power conductor, where one conductor carries the A-phase, another carries the B-phase, and another carries the C-phase. Each such conductor is electrically connected to a primary 118 of a respective step-down transformer 120 that may be arranged to work with input and output voltages like those stated above. A secondary 122 for each phase is in turn connected to the inputs of one of the respective power factor correction units in the power factor correction stage 114. Fuses 124 are provided on a lead of each transformer so as to protect the power factor correction stage 114 from overloads and other faults. As shown here, each transformer 120 is matched in size and other specifications to the other transformers in the transformer stage 112, and each is electrically isolated from the others (e.g., the leads on the secondary side of the transformers are not connected to each other and/or to a common ground).

The power factor correction stage 114 includes three separate but matched power factor correction units, where the phase-c power factor correction unit is typical and is labeled in the figure. The unit receives power from the corresponding transformer 120 and passes it through a bridge rectifier 126 made up of two pairs of diodes, arranged in a familiar manner.

The rectified power then passes through inductor 128, which acts as an energy storage device by being energized for a particular fraction of the power factor correction unit's switching cycle, and de-energized for the remainder of the cycle. The level of energy transfer determines the input-to-output voltage ratio for the stage 114, which allows the power supply system 110 to provide accurate voltage control.

Such switching and control is achieved in this example by a MOSFET switch 132 in respective ones of each such power factor correction unit. The MOSFET switch 132 may take a number of forms (and could be a MOSFET, IGBT, or other appropriate form of switch). The MOSFET switch 132 is controlled to switch on and off as appropriate so as to permit conduction or to block current flow, so that both inductor current and output capacitor voltage are regulated.

The MOSFET switch 132 can be controlled in an integrated manner by an IC controller (not shown) of various types, such as the Fairchild FAN series of active power factor correction controllers, available from Fairchild Semiconductor Corporation (San Jose, Calif.). Other controllers are available from Texas Instruments, and can take the form of various appropriate microcontrollers for controlling power distribution equipment in the manners discussed here.

The controller for each power factor correction unit may communicate with controllers for the other units in the power supply system 110. The communication can be direct from one such controller to another. Alternatively, or in addition, a single controller may control the MOSFET switches for each of the three power factor correction units. As a result, the power leaving each of the power factor correction units may be consistent in its form across all the units or 3-phase line current can be balanced. Also, multiple levels of controllers may be employed, so that each controller that directly controls a switch or group of switches may communicate with, and in turn be controlled by, another controller at a higher hierarchical level of an overall system. A single master controller (e.g., operated by a remote computer system) may communicate with and control each of the controllers at lower levels of the hierarchical arrangement.

The current, as regulated by the MOSFET switch 132, may exit the power factor correction unit through a diode 130, and the exiting conductor may be joined with the conductors associated with power from the other respective phases of the original three-phase AC power that entered the power supply system 110. As rectified and regulated, the power from each of the units may then be easily joined together and provided for use by one or more loads via terminals 136, 138, which are tied together across a single common capacitor 134.

The outputs that tie to terminal 138 are, in this example, also each tied together and to a common ground 140. Such connection of the neutral line allows the power from all three phases to be combined on the DC side of the transformer at relatively low voltages (e.g., 450 volts, 400 volts, or lower) in an effective manner and thus to increase the level of power that can be delivered on a particular circuit by the power supply system 110.

The use of single-phase PFC circuits normally shows a second harmonic ripple voltage on the output capacitor because input instantaneous power sin ^2=1−cos(2wt), appears on the capacitor. But by combining the three single-phase power factor correction stages together, the second harmonic can be cancelled out. As a result, in the circuit discussed here, the capacitor 134 is a dominant factor determining the life time performance of the system, and the system can have a relatively long lifetime. In addition or alternatively, a smaller capacitor 134 can be used because its ripple voltage is lower in the example circuit as compared to other circuits.

In operation then, three-phase AC power enters the power supply system 110 at terminals 116 from a line that includes a separate conductor for each phase of the power. The power for each phase then passes through the three separate transformers and emerges as AC power at the same relative phases, but at lower voltage.

That power then leaves the transformer stage 112 and enters the power factor correction stage 114, where the rectifiers 126 operate in a conventional manner to replace the negative portion of the AC signal with a mirror-image positive portion. The power then passes out through diode 130 from each respective power factor correction unit in parallel, but is modulated by the high-speed switching of the respective MOSFET switches 132 operated according the relevant controller that is programmed so as to maintain a consistent and controlled voltage flowing out of each such unit and the power supply system 110.

Such processing may occur constantly and in parallel for the three phases of the power, and the outputs from the portions of the power supply system 110 that serve each phase can then be combined and provided at terminal 136, while the other outputs are connected to terminal 138 and to a common earth ground.

In this manner, then, the power supply as described can provide a highly regulated supply of power at a controlled voltage, while still being able to combine power from the three incoming phases in a simple and reliable manner, and at a relatively low voltage level such as at about 460 volts or below, 400 volts or below, or 240 volts or below (e.g., between about 240 volts and about 460 volts, where variability may be created by transients and other common factors in an electric generation system).

Figure 1B:
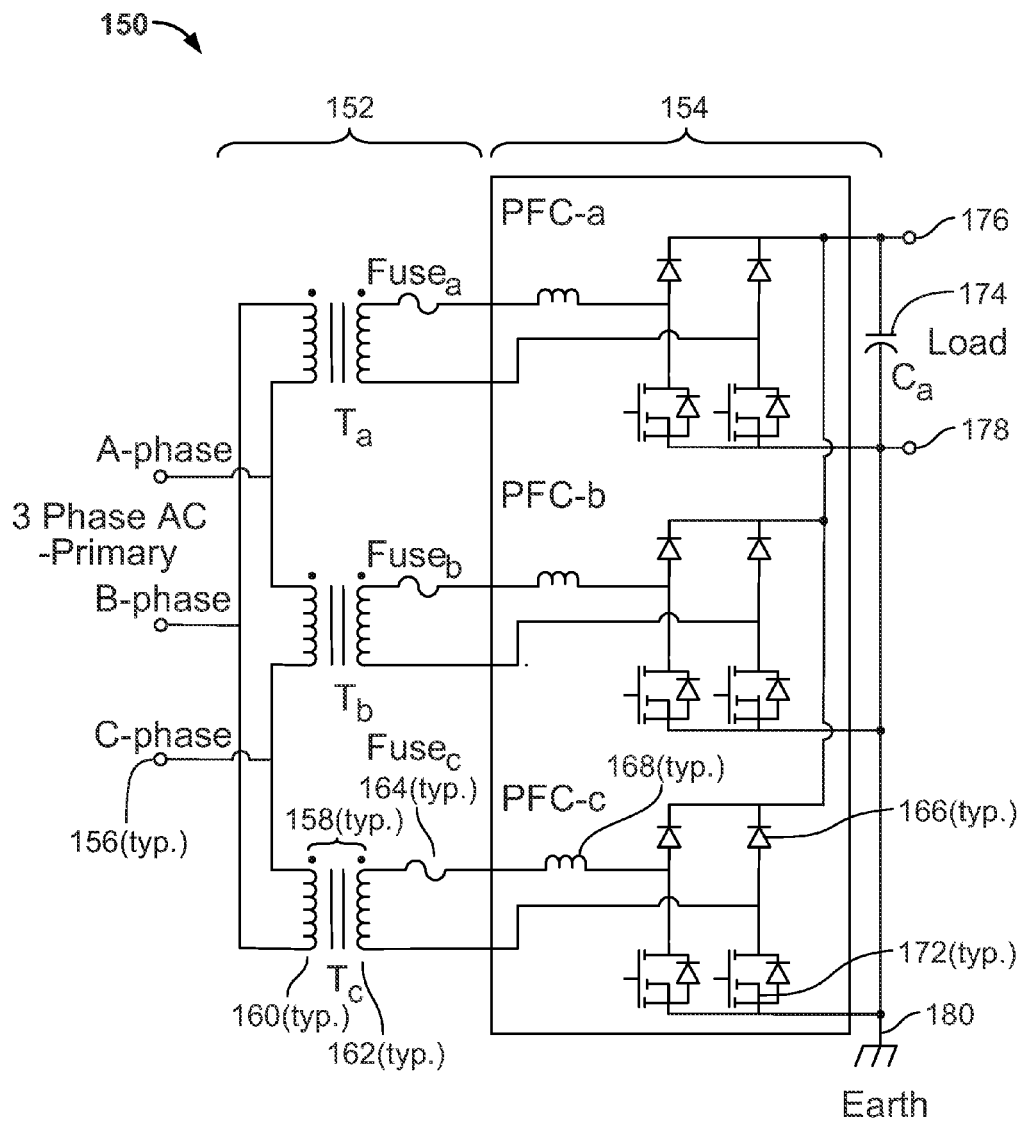
FIG. 1B is a schematic diagram of a three-phase power supply.

FIG. 1B is a schematic diagram of a three-phase power supply 150. In comparison to FIG. 1A, the supply in that figure has a diode bridge that contains four diodes. Its forward voltage drop from such diodes increases the power loss for the system. FIG. 1B shows a circuit without a bridge diode, so its efficiency is improved in relation to the system of FIG. 1A, at least in this particular regard. The circuit shown in FIG. 1B is widely used with additional circuitry to minimize a common mode noise, but in this implementations, the earth ground on the negative terminal of the output may act to eliminate the concern for common mode noise. Power supply 150 includes a number of components in common with power supply system 110 and generally differs in that power supply 150 uses pairs or MOSFET switches in the power factor correction stage 154 rather than rectifiers tied to single MOSFET-switched circuits.

In the power supply 150, there is again a transformer stage 152 and a power factor correction stage 154. Power enters though a trio of conductors 156 that each carry a single phase form a three-phase power feed, such as a feed providing power at about several kilovolts. Each phase of the power is then passed through a respective transformer 158 having a primary 160 and a secondary 162, and also including a fuse 164 for overload and other protection.

The power then passes through respective inductors 168 and is regulated by a pair of MOSFET switches 172 that are operated in combination to provide a rectified DC signal through diodes 166. The outputs of each of the respective power factor correction units are then tied together, as they were in the power supply system 110 of FIG. 1A. In particular, the positive outputs are tied together and to a terminal 176 that may be connected to one or more loads. The other outputs are tied together to terminal 178 (which is connected to terminal 176 via capacitor 175) and also to earth ground 180. Thus, in operation, power supply 150 works in a manner like power supply system 110, though with variations in the power factor correction stage.

Figure 2:
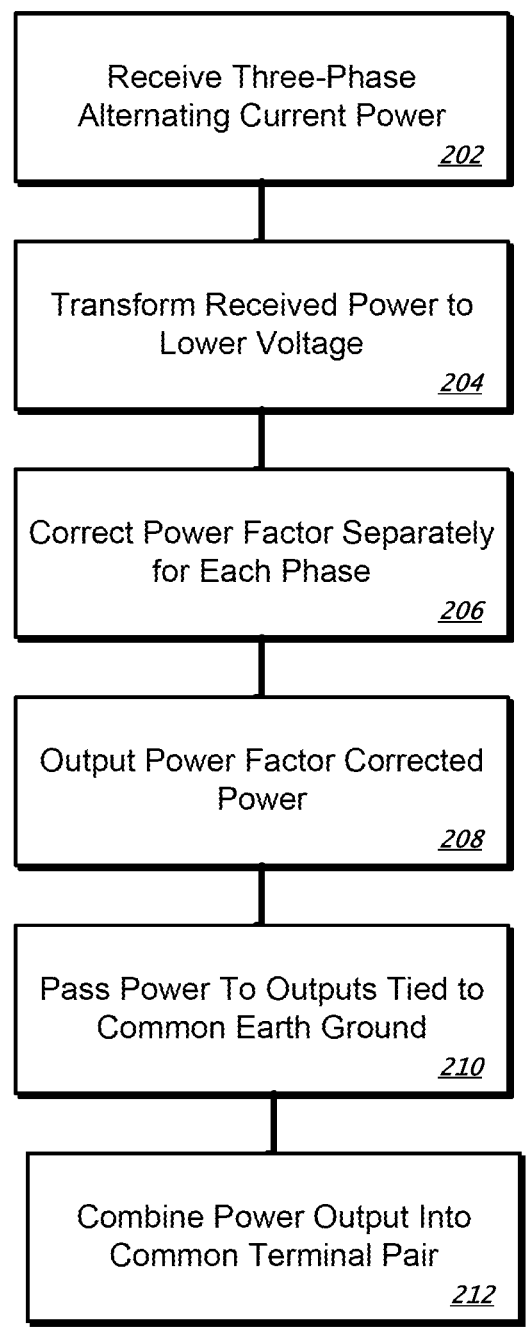
FIG. 2 is a flow chart of a process for providing power to one or more loads using a three-phase power supply.

FIG. 2 is a flow chart of a process for providing power to one or more loads using a three-phase power supply. The process begins at box 202 where a power supply system receives power that is provided on three separate conductors as three-phase power (where a fourth conductor may be a neutral), where each phase is 120 degrees out of phase with the next and previous phases.

Each phase of the power input is then provided to a respective one of three independent transformers that are each arranged to step down the power of their respective stage by a predetermined voltage level that is determined by the physical structure of the transformer (box 204). Each of the transformers is matched, in that they each take an equal voltage level and produce an equal voltage level when compared to each other.

At box 206, power factor is corrected individually for each phase of the power. Such correction may involve passing each phase through a rectifier and then a switched portion of a switched-mode power supply so as to produce a DC output of a constant and controllable regulated voltage. Alternative, a set of switches tied to the respective lines of the power factor correction circuit and to diodes that are switched in coordination may also be used to produce the regulated DC output. Such switching may be controlled by a particular controller for each power factor correction unit, or a common controller used to coordinate the action of all three power factor correction units.

At box 208, the power from each of the respective power factor correction units is provided as an output, and at box 210 the power from each unit is passed to outputs that are tied to a common earth ground and then to a first terminal that is available for connection to one or more downstream loads, such as power strips for one or more computer server racks. The other terminal is connected to the other outputs of each of the power factor correction units, which outputs can be tied together in such a manner because their grounds are common with each other.

Many other implementations other than those described may be employed, and may be encompassed by the following claims.

What is claimed is:

1. An electric three-phase power supply system, comprising:
    a primary stage arranged to receive an input of three-phase alternating current power;
    a transformer stage arranged to receive power from the primary stage and to reduce the three-phase AC power in voltage level, the transformer stage including a respective independent secondary winding for each of the phases in the alternating current power;
    a power factor correction (PFC) stage having a plurality of PFC units that each receive AC power for one of the phases in the alternating current power from the transformer stage wherein each PFC stage includes a rectifier operated by an electronically-controlled switch to regulate inductor current and capacitor voltage in each respective PFC stage; and
    a pair of output terminals that receive power from the PFC units, wherein output terminals of each of the PFC units are tied to each other, and ground terminals of each of the PFC units are tied to a common ground.

2. An electric power supply system, comprising:
    a transformer stage arranged to receive three-phase alternating current (AC) power and to reduce the three-phase AC power in voltage level;
    a power factor correction (PFC) stage having a plurality of PFC units that each receive AC power from the transformer stage, wherein each PFC unit includes a rectifier operated by an electronically-controlled switch to regulate inductor current and capacitor voltage in each respective PFC unit;
    a pair of output terminals that receive power from the PFC units; and
    a ground line that connects outputs of each of the plurality of PFC units to a common ground, and wherein the inputs of the respective PFC units are not connected to each other.

3. The electric power supply system of claim 2, wherein the pair of output terminals is connected together by a capacitor connected in parallel with a load served by the electric power supply system.

4. The electric power supply system of claim 3, wherein the rectifier comprises two pairs of diodes, wherein a first diode of each pair has an input connected to a first lead from the transformer stage.

5. The electric power supply system of claim 2, wherein each of the PFC units has a step-down winding in the transformer stage that is separate from windings for the other of the plurality of PFC units.

6. The electric power supply system of claim 5, wherein the outputs from each of the PFC units are connected to each other.

7. The electric power supply system of claim 2, wherein each of the PFC units comprises a diode set arranged to rectify the AC power.

8. The electric power supply system of claim 2, wherein each of the PFC units comprises a respective PFC controller, and wherein each of the PCF controllers is arranged to synchronize switching of a corresponding PFC unit with switching of the other PFC units.

9. The electric power supply system of claim 2, wherein the output terminals are connected to supply power to one or more computer server systems in a computer data center.

10. The electric power supply system of claim 2, wherein the three-phase AC power is received by the transformer section between one and 50 kilovolts, and is supplied to the PFC section between 0 and 500 volts.

11. A method for supplying electric power to one or more loads, the method comprising:
    receiving three-phase alternating current power at terminals of a power supply system;
    transforming the power to a lower voltage through a transformer section of the power supply system;
    correcting power factor of the transformed power in a power factor correction unit that includes a separate power factor module for each phase of the transformed power, including by passing each phase of the power through a rectifier operated by an electronically-controlled switch to regulate inductor current and capacitor voltage in each respective power factor correction module;

passing the power through outputs of the power factor correction modules, each of the power factor correction modules having an output that is tied to a ground that is common to the power factor correction modules; and combining the power from the power factor correction modules into a single pair of terminals or a single output capacitor for supplying the power from the power factor correction modules.

12. The method of claim 11, further comprising controlling the power factor correction modules using MOSFET switches.

13. The method of claim 12, wherein the MOSFET switches are controlled in a coordinated manner by a common power factor correction controller.

14. The electric power supply system of claim 2, wherein the rectifier comprises a pair of diodes controlled by a pair of automatically controlled switches that are operated in combination with each other to provide a rectified DC signal through the pair of diodes.

15. The electric power supply system of claim 2, wherein the electronically-controlled switches in each of the PFC units is controlled by a single common controller.

16. The electric power supply system of claim 15, wherein a particular central controller controls operations of controllers that each control operation of electronically-controlled switches in particular PFC units that supply power to different loads.

17. An electric power supply system, comprising:
a transformer stage arranged to receive three-phase alternating current (AC) power and to reduce the three-phase AC power in voltage level;
a power factor correction (PFC) stage having a plurality of PFC units that each receive AC power from the transformer stage;
a pair of output terminals that receive power from the PFC units; and
a ground line that connects outputs of each of the plurality of PFC units to a common ground, and wherein the inputs of the respective PFC units are not connected to each other wherein
each of the PFC units comprises a diode set arranged to rectify the AC power, and
the diode set comprises two pairs of diodes, wherein each pair of diodes is arranged on opposed sides of a particular power input to the corresponding PFC unit.

18. The method of claim 11, wherein transforming the power comprises passing each phase of the three-phase alternating current power through a single three-phase transformer or three separate single-phase transformers.

19. The method of claim 18, further comprising providing power from the pair of terminals to one or more computer systems in a computer data center.

20. The method of 19, wherein the power is provided to the computer systems above 0 volts and below 500 volts.

* * * * *